United States Patent
McLeod

(10) Patent No.: US 8,587,673 B2
(45) Date of Patent: *Nov. 19, 2013

(54) CAMERA IMAGE STABILIZATION

(71) Applicant: STMicroelectronics (R&D) Ltd., Marlow Bucks (GB)

(72) Inventor: Stuart McLeod, Linlithgow (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,865

(22) Filed: Apr. 4, 2013

(65) Prior Publication Data

US 2013/0222623 A1 Aug. 29, 2013

Related U.S. Application Data

(63) Continuation of application No. 12/899,137, filed on Oct. 6, 2010, now Pat. No. 8,416,307.

(30) Foreign Application Priority Data

Oct. 30, 2009 (GB) .................................. 0919036.4

(51) Int. Cl.
*H04N 5/228* (2006.01)

(52) U.S. Cl.
USPC ................................... 348/208.2; 348/208.7

(58) Field of Classification Search
USPC ................... 348/208.99, 208.2, 208.4–208.8, 348/208.11
See application file for complete search history.

(56) References Cited

U.S. PATENT DOCUMENTS 8,169,487 B2 5/2012 Noguchi
8,416,307 B2 * 4/2013 McLeod .................... 348/208.2

FOREIGN PATENT DOCUMENTS

JP 2004228644 8/2004
JP 2009063896 3/2009

* cited by examiner

*Primary Examiner* — Daniel M Pasiewicz
(74) *Attorney, Agent, or Firm* — Allen, Dyer, Doppelt, Milbrath & Gilchrist, P.A.

(57) ABSTRACT

A method of motion compensation in a camera may include deriving a motion signal representative of a motion of the camera, processing video frames of a video signal from an image sensor of the camera during a viewfinder mode to derive motion vectors between pairs of frames, and processing the motion signal with a number of combinations of gain and offset factors during the viewfinder mode. The method may also include determining combinations for producing threshold motion vectors, and applying the combination producing the threshold motion vectors for processing the motion signal during a still capture mode to produce a control signal for a motion compensating element for optics of the camera.

26 Claims, 2 Drawing Sheets

CAMERA IMAGE STABILIZATION

FIELD OF THE INVENTION

This present disclosure relates to image stabilization in digital cameras.

BACKGROUND OF THE INVENTION

Optical image stabilization is typically provided in cameras and in other optical apparatuses, such as binoculars. Optical image stabilization is performed by providing a movable optical element within the optical system, which is moved to compensate for movement, such as from a hand tremor. As shown in FIG. 1, this is normally performed by an open loop system in which motion is detected by a gyro. The gyro signal is processed to remove gyro offset and then perform high pass filtering and integration. The resulting signal is used to control movement of the movable optical element.

Such open loop control may be subject to a number of errors. The offset and the sensitivity of the gyro both may vary with temperature. The motion compensator response also may vary with temperature. The integration in the signal processing may accentuate the problem.

In sophisticated cameras, these problems can be minimized by careful attention to the design and quality of electronic and mechanical components. However, in low-cost cameras, there may be a limit to the quality and consistency that can be achieved. Moreover, in applications such as cameras for incorporation in mobile phones, the physical size of the camera is limited, typically in the region of 1 cm$^3$, and this very small size may necessitate compromises in opto-mechanical component performance.

Another known form of image stabilization is digital image stabilization, which is used in some video (moving picture) cameras. This is achieved by a combination of cropping and object tracking. Referring to FIG. 2, the output image 10 is cropped from a larger image area 12. Motion of an object 14 is tracked between frames. In FIG. 2, the object 14 moves by motion vectors x, y between frames. By moving the crop 10 by x, y, the object appears to remain stationary within the output video. The motion vector signals are typically filtered at 0.3 Hz to allow deliberate camera motion while removing any high frequency motion.

SUMMARY OF THE INVENTION

An object may be to provide image stabilization for digital cameras that may be suitable for incorporation in small cameras, such as those found in mobile phones.

However, the present disclosure is not limited to such cameras and may be utilized, for example, in devices which are purely hand-held cameras.

An aspect is directed to a camera that may have an optical path and an image sensor, the camera having a motion compensation system. The motion compensation system may include a motion compensating optical element positioned in the optical path and driven by an actuator, a gyro providing a gyro signal representative of motion of the camera, an optical image stabilization (OIS) processor arranged to perform signal processing on the gyro signal, which includes applying variable gain and gyro offset correction factors, a digital image stabilization (DIS) processor arranged to receive video frames from the image sensor during a viewfinder mode and to derive motion vectors representing movement of an object between pairs of frames, and a control circuit operating to cause the OIS processor to cycle through a number of combinations of gain and offset during the viewfinder mode and to detect which of the combinations results in the smallest motion vectors in the DIS processor. The control circuit also may operate to cause that combination to be used in the OIS processor when an image is to be recorded.

In some embodiments, the gyro signal may be high-pass filtered before being applied to the OIS processor. The video signal may also be high-pass filtered before being applied to the DIS processor. Suitably, both signals may be filtered between 0.1 Hz and 0.5 Hz, preferably at about 0.3 Hz. For example, the OIS processor may integrate the gyro signal.

Another aspect is directed to a method of motion compensation in a digital camera. The method may include deriving a motion signal representative of motion of the camera, processing video frames of a video signal from an image sensor of the camera during a viewfinder mode to derive motion vectors between pairs of frames, processing the motion signal with a number of combinations of gain and offset during the viewfinder mode, determining which of the combinations produces the smallest motion vectors, and applying that combination for processing the motion signal during a still capture mode to produce a control signal for a motion compensating element of the camera optics.

In some embodiments, the number of combinations and the video frame rate may be chosen such that the determination of smallest motion vectors occurs during a period no longer than 5 seconds, preferably about 2 seconds. About 25 combinations of gain and offset may advantageously be used.

The motion signal may be high-pass filtered before being processed. The video signal may also be high-pass filtered before being processed. Both signals may be filtered at between 0.1 Hz and 0.5 Hz, preferably about 0.3 Hz. The motion signal processing may include integration. A further aspect of the present disclosure is directed to a mobile phone including the camera defined above.

BRIEF DESCRIPTION OF THE DRAWINGS

An embodiment of the present disclosure may now be described, by way of example only, with reference to the drawings, in which.

DETAILED DESCRIPTION OF THE PREFERRED EMBODIMENTS

Figure 1:
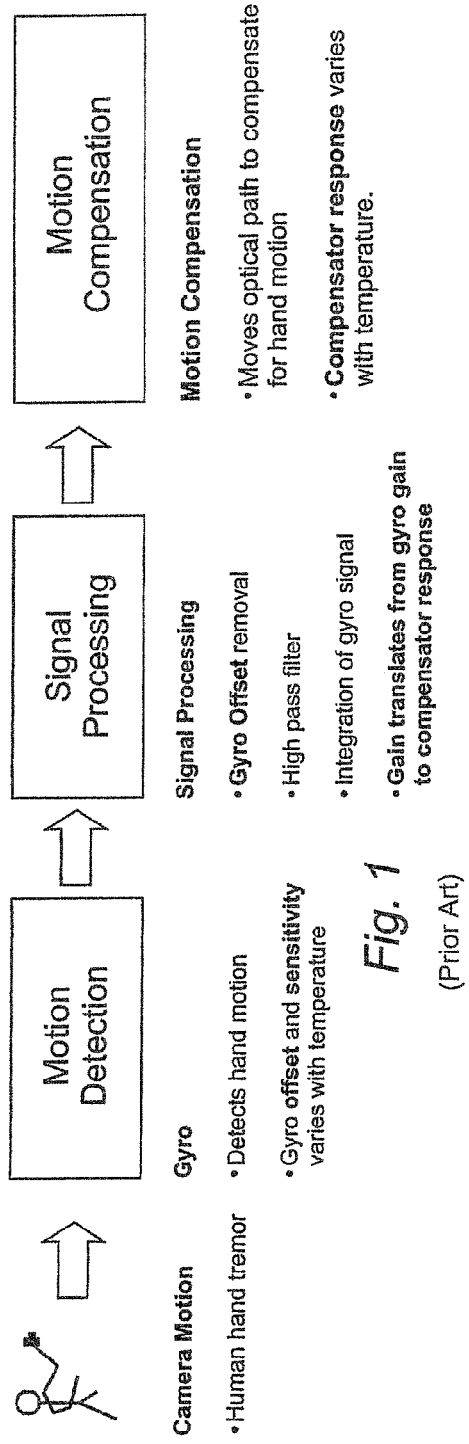
FIGS. 1 and 2 are diagrams, according to the prior art.
Figure 2:
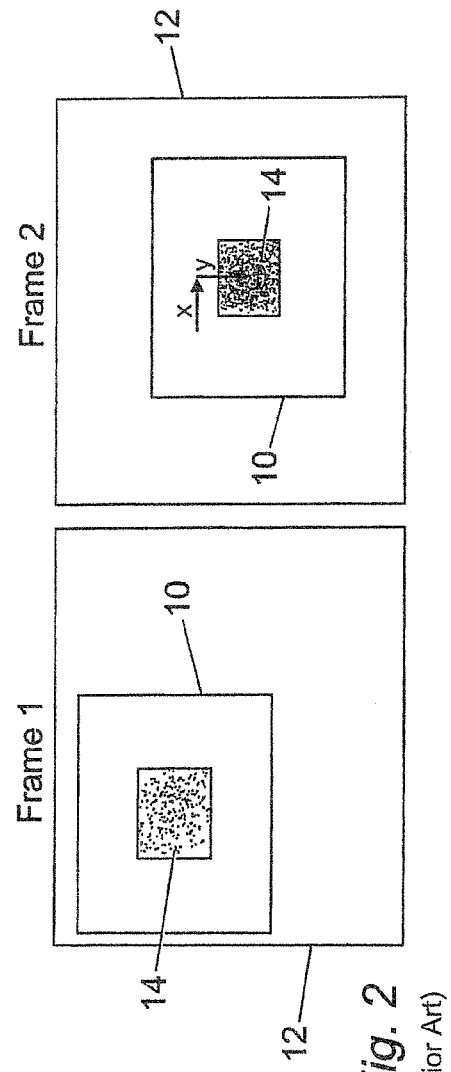
Figure 3:
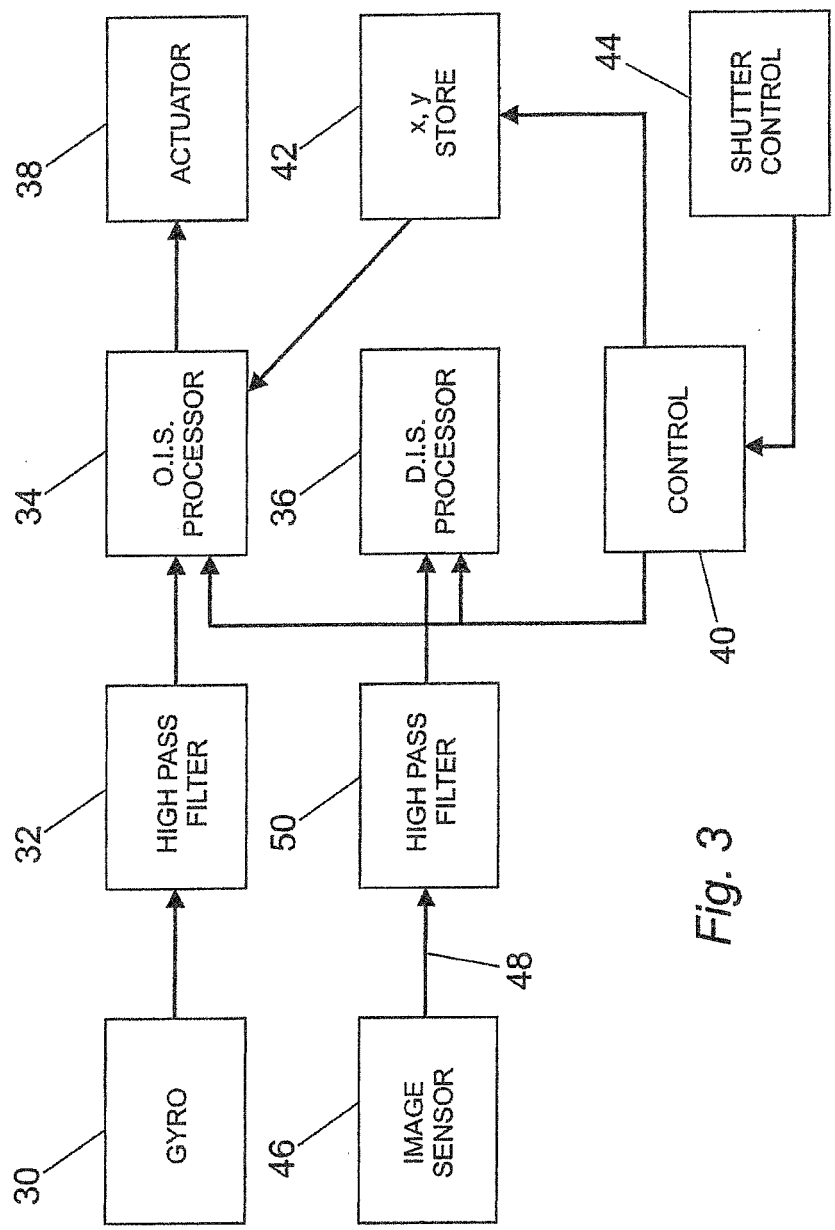
FIG. 3 is a schematic block diagram of a system, according to the present disclosure.

Referring to FIG. 3, in a camera embodying the present disclosure, motion is detected by a gyro 30. The output signal from the gyro 30 is filtered by a high-pass filter 32 to remove frequencies below, in this embodiment, 0.3 Hz. The filtered gyro signal is passed to an optical image stabilization (OIS) processor 34. The OIS processor 34 may include means or an integrator for integration of the gyro signal. A motion compensation actuator 38 is controlled by the OIS processor 34 in the manner to be described.

An image sensor 46 of the camera provides image signals at 48 to a digital image stabilization (DIS) processor 36 via a high-pass filter 50. The high pass filter 50 suitably has the same frequency characteristic as the filter 32. When the camera is switched on, and until the shutter control is operated, the signals 48 constitute a video stream for display on a viewfinder screen.

The signal processors 34, 36 are controlled by a control circuit 40. The operation is based on the fact that if the OIS system is optimized, then the DIS motion vectors should be zero. The control circuit 40 causes the OIS processor 34 during the viewfinder video mode to cycle through a range of gain and offset settings. For each pair of settings, the DIS processor produces motion vectors by examining motion of an object between first and second frames of a pair of successive frames. Distinguishing, selecting and tracking a suitable object within the field of view is known from the field of digital image stabilization. The resulting motion vectors are stored in a store 42. When the user operates the shutter control 44, the control circuit 40 selects the combination of gain and offset which has produced the smallest motion vectors, and causes the OIS processor 34 to apply this combination in controlling the motion compensation actuator 38, thus optimizing the compensation.

One suitable arrangement is to use 25 different gain/offset combinations. Each of these may be maintained for two video frames in order to capture motion vectors. Therefore a time period of about 2 seconds may be used to cycle through the 25 combinations, which may typically be comfortably within the time taken by the user find the picture in the viewfinder. Other time periods up to about 5 seconds may be used.

The present disclosure thus provides a way by which an open-loop OIS system can be optimized by the application of DIS techniques. The optimization can be handled digitally within signal processing circuitry which can, for example, be part of a single-chip CMOS image sensor. The optimization allows image stabilization to be achieved in a small low-cost camera without requiring use of highly accurate opto-mechanical components.

That which is claimed is:

1. An electronic device comprising:
    an image sensor;
    a motion sensor configured to provide a motion signal representative of motion of the electronic device; and
    processing circuitry coupled to said image sensor and motion sensor and configured to
        apply variable gain and motion offset correction factors,
        receive a video signal from said image sensor during a viewfinder mode and to derive motion vectors representing movement of an object from the video signal,
        cycle through a plurality of combinations of the variable gain and motion offset correction factors during the viewfinder mode and detect which combination results in a threshold motion vector, and
        use the combination resulting in the threshold motion vector to record the image.

2. The electronic device according to claim 1 further comprising an actuator; and a motion compensating optical element positioned in an optical path associated with said image sensor and configured to be driven by said actuator.

3. The electronic device according to claim 1 wherein said motion sensor comprises a gyro.

4. The electronic device according to claim 1 wherein the threshold motion vector comprises a minimum motion vector.

5. The electronic device according to claim 1 further comprising a first high-pass filter configured to filter the motion signal and output it to said processing circuitry.

6. The electronic device according to claim 5 wherein further comprising a second high-pass filter configured to filter the video signal and to output it to said processing circuitry.

7. The electronic device according to claim 6 said first and second high-pass filters are configured to filter between 0.1 Hz and 0.5 Hz.

8. The electronic device according to claim 6 wherein said first and second high-pass filters are configured to filter frequencies below 0.3 Hz.

9. The electronic device according to claim 1 wherein said processing circuitry is configured to integrate the motion signal.

10. The electronic device according to claim 1 wherein the electronic device comprises one of a camera and a mobile telephone.

11. An electronic device comprising:
    an image sensor;
    a gyro configured to provide a gyro signal representative of motion of the electronic device; and
    processing circuitry coupled to said image sensor and gyro and configured to
        apply variable gain and motion offset correction factors,
        receive a video signal from said image sensor during a viewfinder mode and to derive motion vectors representing movement of an object from the video signal,
        cycle through a plurality of combinations of the variable gain and motion offset correction factors during the viewfinder mode and detect which combination results in a minimum motion vector, and
        use the combination resulting in the minimum motion vector to record the image.

12. The electronic device according to claim 11 further comprising an actuator; and a motion compensating optical element positioned in an optical path associated with said image sensor and configured to be driven by said actuator.

13. The electronic device according to claim 11 further comprising a first high-pass filter configured to filter the motion signal and output it to said processing circuitry.

14. The electronic device according to claim 13 further comprising a second high-pass filter configured to filter the video signal and to output it to said processing circuitry.

15. The electronic device according to claim 14 wherein said first and second high-pass filters are configured to filter between 0.1 Hz and 0.5 Hz.

16. The electronic device according to claim 14 wherein said first and second high-pass filters are configured to filter frequencies below 0.3 Hz.

17. The electronic device according to claim 11 wherein said processing circuitry is configured to integrate the motion signal.

18. A method of operating an electronic device comprising an image sensor, and a motion sensor configured to provide a motion signal representative of motion of the electronic device, the method comprising:
    applying variable gain and motion offset correction factors;
    receiving a video signal from the image sensor during a viewfinder mode and to derive motion vectors representing movement of an object from the video signal;
    cycling through a plurality of combinations of the variable gain and motion offset correction factors during the viewfinder mode and detect which combination results in a threshold motion vector; and
    using the combination resulting in the threshold motion vector to record the image.

19. The method according to claim 18 further comprising driving an actuator to position a motion compensating optical element in an optical path associated with the image sensor.

20. The method according to claim 18 wherein the motion sensor comprises a gyro.

21. The method according to claim 18 wherein the threshold motion vector comprises a minimum motion vector.

22. The method according to claim 18 further comprising performing a first high-pass filtering of the motion signal.

23. The method according to claim 22 further comprising performing a second high-pass filtering of the video signal.

24. The method according to claim 23 the first and second high-pass filtering are in a range between 0.1 Hz and 0.5 Hz.

25. The method according to claim 23 wherein the first and second high-pass filters are at frequencies below 0.3 Hz.

26. The method according to claim 18 wherein the electronic device comprises one of a camera and a mobile telephone.

* * * * *